United States Patent Office 2,722,765
Patented Nov. 8, 1955

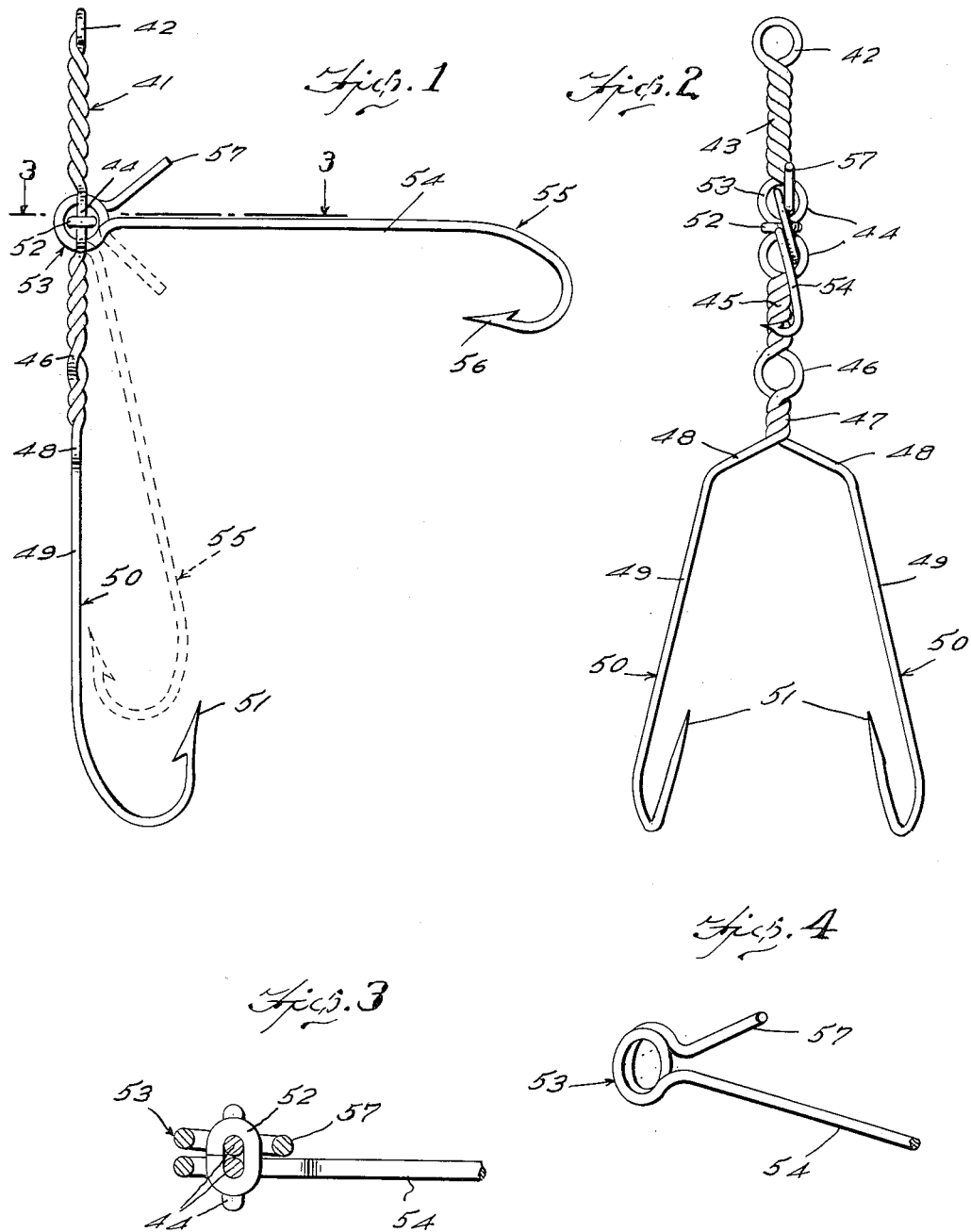

2,722,765

FISH HOOK

Frank Andren, Cleveland, Ohio

Application September 5, 1951, Serial No. 245,161

2 Claims. (Cl. 43—37)

This invention relates generally to the class of fishing and trapping and is directed particularly to improvements in fish hooks.

An object of the present invention is to provide a fishing hook which comprises a combined bait carrying hook and a pair of gaff hooks which are assembled in a novel manner whereby when the fish takes the bait hook, such hook will move toward the gaff hooks to effect the engagement of the gaff hooks in the fish's gills.

Another object of the invention is the provision of a combination hook structure incorporating a bait hook and gaff hooks, with the bait hook mounted for pivotal movement relative to the gaff hooks and in which resilient means provides frictional engagement between the bait hook and supporting structure to prevent inadvertent movement of the bait hook.

A still further object of the invention is to provide a combination hook structure of the character stated which is so designed that the bait hook and the gaff hooks, when closed together for securing or trapping a fish, will be effectively held against reverse movement or separatory movement so that the possibility of the fish escaping is reduced to a minimum.

Other objects and advantages of the invention will become apparent as the description of the same proceeds and the invention will be best understood from a consideration of the following detailed description taken in connection with the accompanying drawings forming part of the specification, with the understanding, however, that the invention is not to be limited to the exact details of construction shown and described since obvious modifications will occur to a person skilled in the art.

In the drawings:

Figure 1 is a view in side elevation of the invention, showing the same in full lines in set position and showing the dotted line position of the bait hook when the device is sprung.

Figure 2 is a view in front elevation of the embodiment shown in Figure 1.

Figure 3 is a horizontal section taken substantially on the line 3—3 of Figure 1.

Figure 4 is a view in perspective of the hinge eye formed at the end of the shank of the bait hook.

With continued reference to the drawing the device of this invention may well comprise a body generally designated 41 and as shown is formed of twisted wire which may be in a single piece or, if preferred, may be made up of two pieces although a single piece is here illustrated. As shown a single piece of wire is bent intermediate its ends to provide the line attaching eye 42. The two portions of wire are then twisted together as indicated at 43 to form a short length of the body whereupon the two connecting eyes 44 are formed, then another short body portion in which the wires are twisted together as indicated at 45. This body portion merges into a rear eye or loop 46 after which the wires are again twisted to form the short terminal body section 47. From this terminal body section 47, the wire ends are extended laterally as indicated at 48 and then rearwardly in divergent relation to form the shanks 49 of the gaff hooks, which are generally designated 50. These shanks terminate in the hook bills or points 51.

Between the two adjacent central eyes 44 a binding clip or loop 52 is placed which encircles the crossed portions of the eyes and these adjacent connected portions of the eyes and the loop 52 form a bar which is encircled by an eye 53 which is fashioned from the end of the shank portion 54 of a bait hook which is generally designated 55. The opposite end of the bait hook has the pointed barb or bill 56.

The eye 53 has, of course, two ends one of which constitutes an extension of the shank 54 while the other end is extended into the short finger 57 which is at an oblique angle to the length of the shank 54 as shown in Figure 4.

The eye 53 is expansible and contractible due to the resiliency of the material and the normal diameter of the expanded eye is such that the same will engage the wall of the eyes 44 with a sufficient frictional engagement to prevent inadvertent movement of the bait hook 55 relative to the body 41 and to retain the bait hook in a position substantially perpendicular to the body 41 prior to being taken by a fish. Upon a pull being exerted on the bait hook 55 by a fish, the frictional resistance will be overcome and the bait hook will swing downwardly toward the body 41 to permit engagement of the points 51 of the gaff hooks 50 with the fish thereby preventing escape of the fish. The finger engaging extension 57 on the eye 53 permits convenient contraction of the eye 53 during movement of the bait hook 55 to set position.

From the foregoing it will be readily apparent that there is provided in the present invention a novel fish hook construction whereby a fish when taking the bait hook will be securely snared by the gaff hooks due to the closing together of the pivotally coupled bait and gaff hooks.

Due to the fact that the bait hook is considerably shorter than the gaff hooks it will be seen that when the fish takes the point of the bait hook in its mouth and the device closes in the manner described, the gaff hooks will be sufficiently far behind the mouth of the fish to effectively engage in the gills or the adjacent soft part of the fish's body thereby insuring a positive hooking of the fish.

I claim:

1. A combined bait and gaff hook structure, comprising an elongate body, a pair of divergently related gaff hooks joined to and extending rigidly from one end thereof, a bait hook pivotally coupled to the body to swing relatively to the gaff hooks in a plane passing centrally between the gaff hooks, and means for holding the bait hook in a set position in which it extends approximately at right angles to the body, said body being formed of two twisted together portions of wire, shaped at one end to form a line eye and formed intermediate its ends to provide an eye structure forming a part of the pivot coupling between the body and the bait hook.

2. A combined bait and gaff hook comprising an elongated substantially rigid body, a gaff hook extending from one end of said body and constituting a substantially rigid continuation thereof, an eye at the opposite end of said body for attaching a line thereto, said body having eye structure intermediate its ends defining retaining walls, a bait hook having a shank, a resilient expandable and contractible eye on the free end of said shank, said eye being pivotally mounted in said eye structure for movement from a position substantially perpendicular to said body to a gaffing position approaching parallelism therewith, said last named eye frictionally engaging the retaining walls of said eye structure to hold said bait hook in said gaffing position, and finger engaging means projecting from said last named eye to facilitate contraction thereof and release of said frictional engagement to permit movement of said bait hook to said gaffing position, whereby upon a fish taking said bait hook the resistance of said frictional engagement will be overcome and said bait hook will move toward said body resulting in a gaffing action of said hooks.

References Cited in the file of this patent

UNITED STATES PATENTS

| | | |
|---|---|---|
| 560,973 | Clayton | May 26, 1896 |
| 1,208,936 | England | Dec. 19, 1916 |
| 1,681,407 | Howell | Aug. 21, 1938 |
| 2,213,624 | Cole | Sept. 3, 1940 |
| 2,356,712 | Tessier | Aug. 22, 1944 |
| 2,366,662 | Weichselbaum | Jan. 2, 1945 |